April 24, 1934.   J. T. WOOD   1,955,869
APPARATUS FOR FEEDING PREDETERMINED DIFFERENT WEIGHTS OF MOLTEN GLASS
Filed Dec. 10, 1932   6 Sheets-Sheet 1
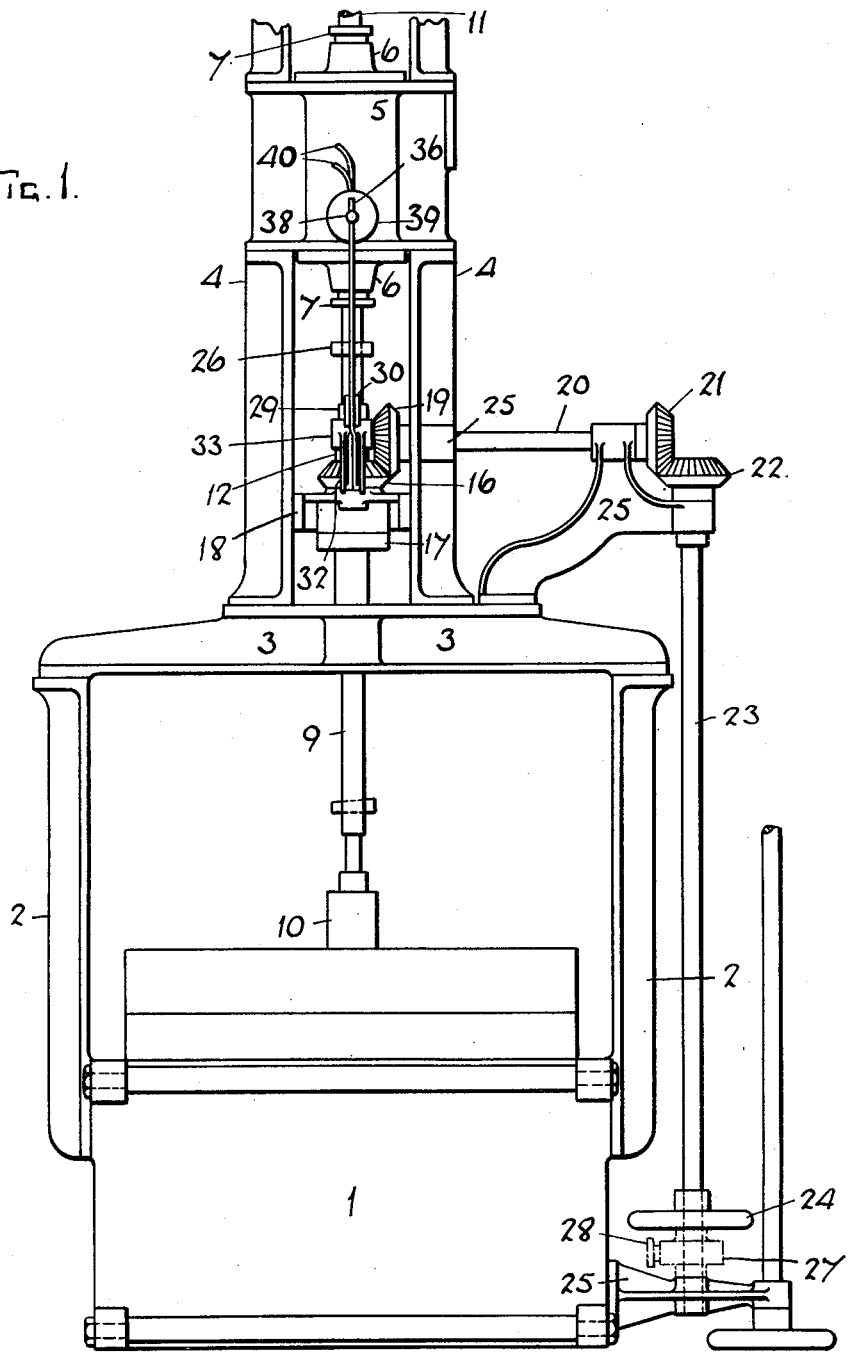

April 24, 1934. J. T. WOOD 1,955,869
APPARATUS FOR FEEDING PREDETERMINED DIFFERENT WEIGHTS OF MOLTEN GLASS
Filed Dec. 10, 1932 6 Sheets-Sheet 2
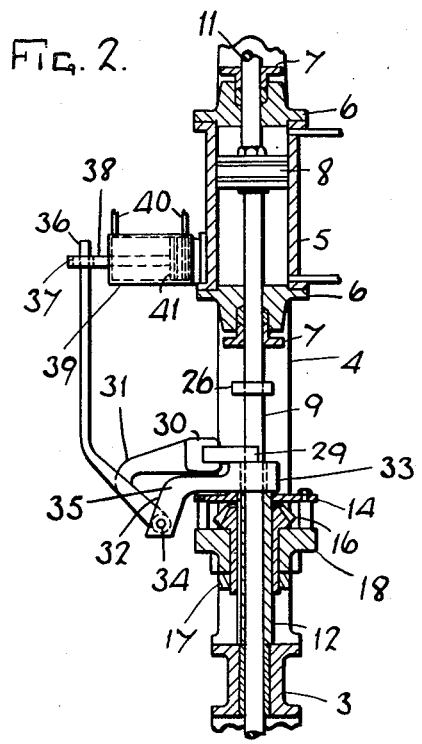
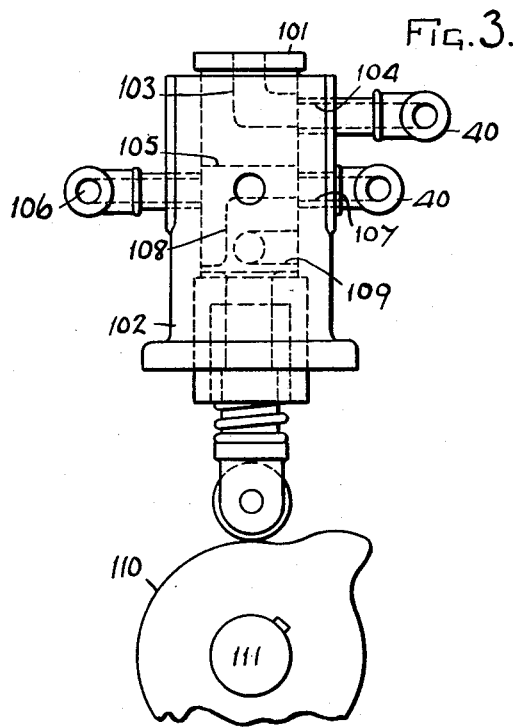
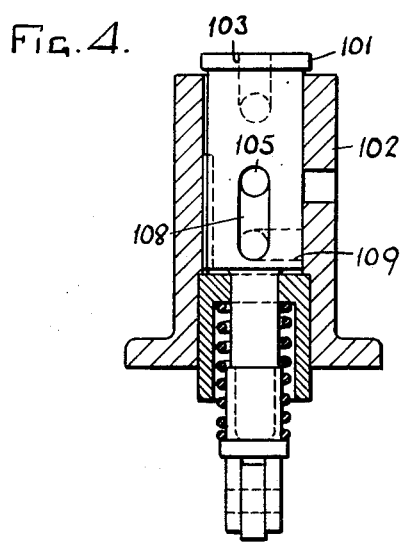
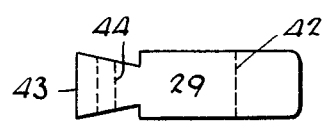
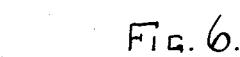
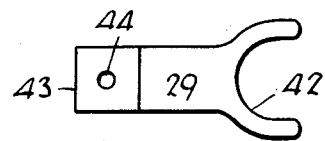
J. T. WOOD
BY
Featherstonhaugh & Tansley J. T. Wood

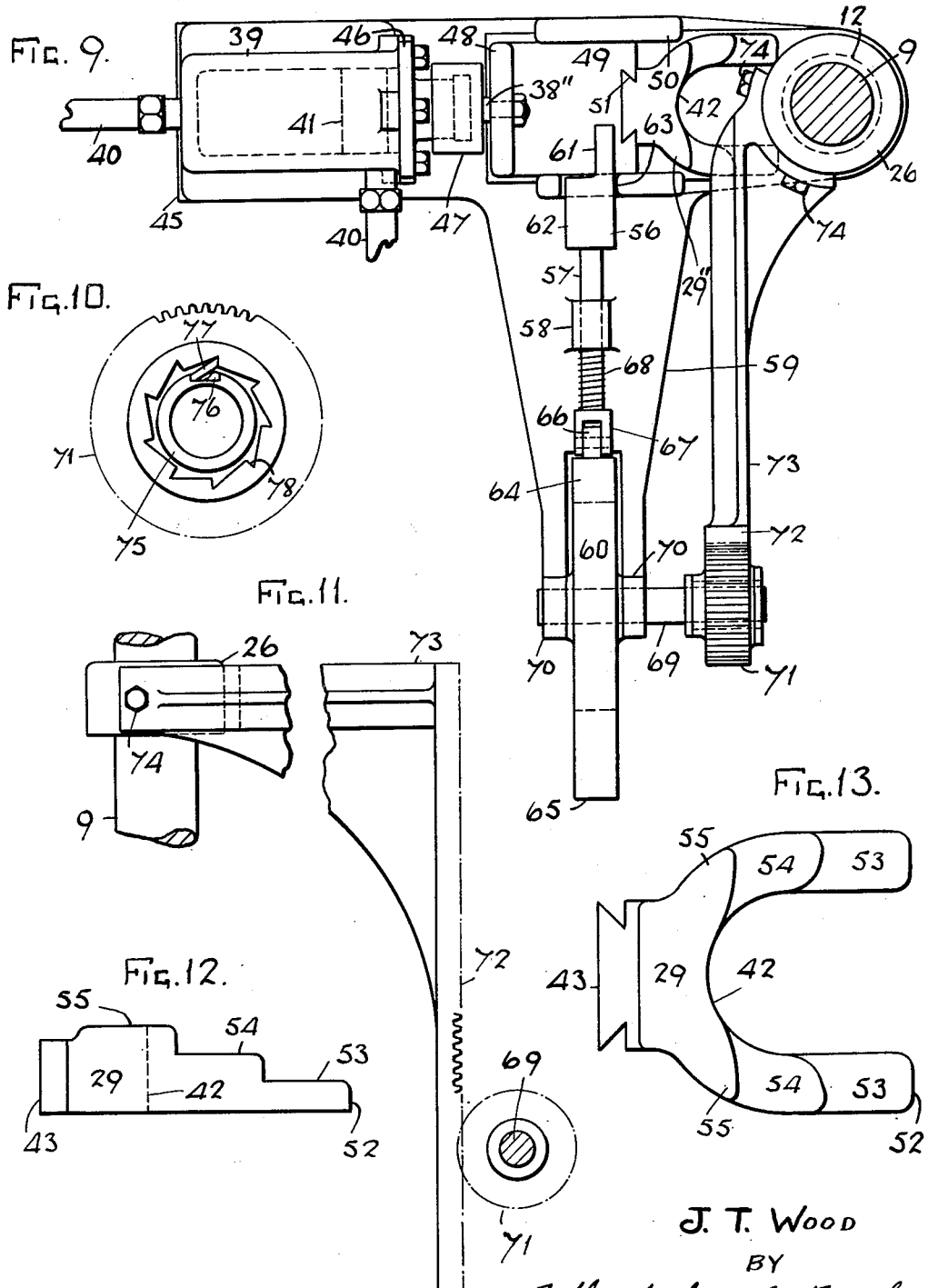

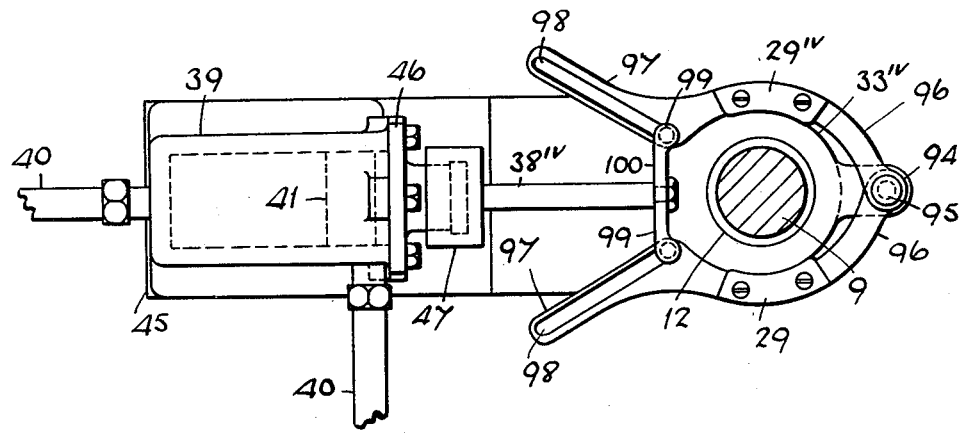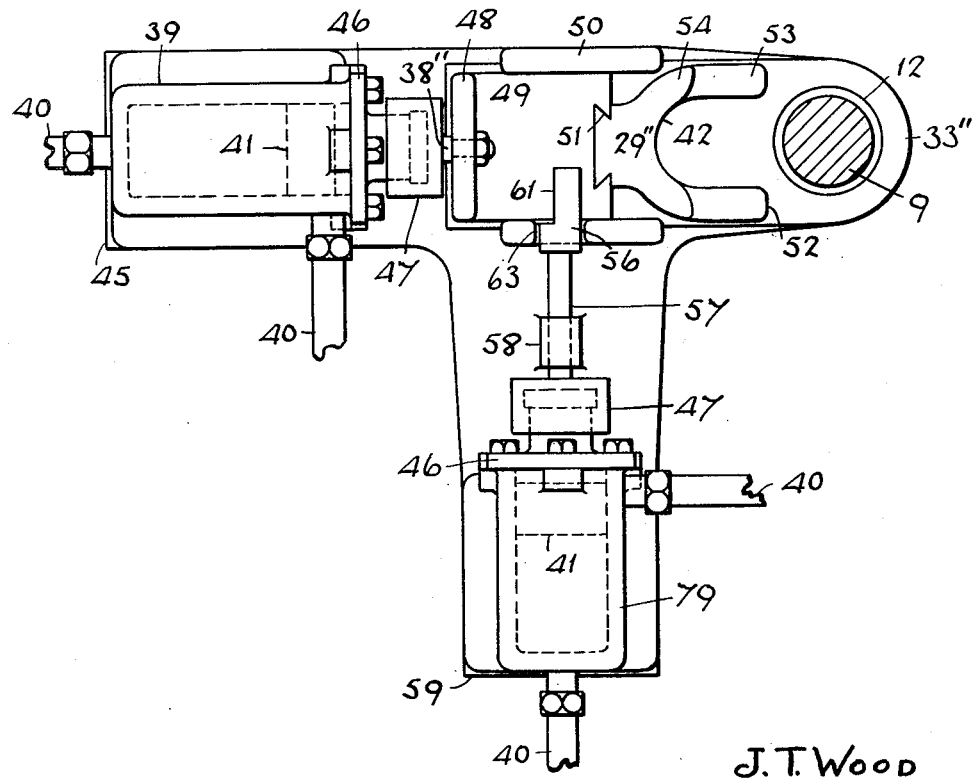

April 24, 1934. J. T. WOOD 1,955,869
APPARATUS FOR FEEDING PREDETERMINED DIFFERENT WEIGHTS OF MOLTEN GLASS
Filed Dec. 10, 1932 6 Sheets-Sheet 6
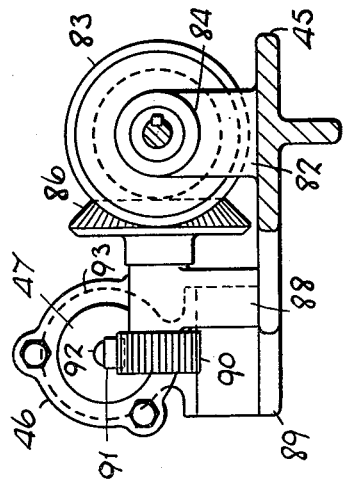
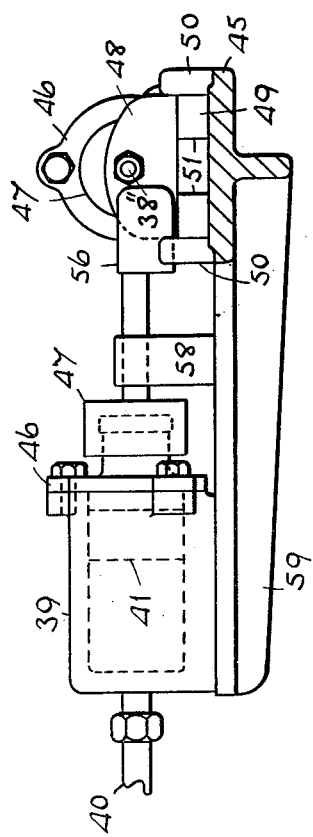
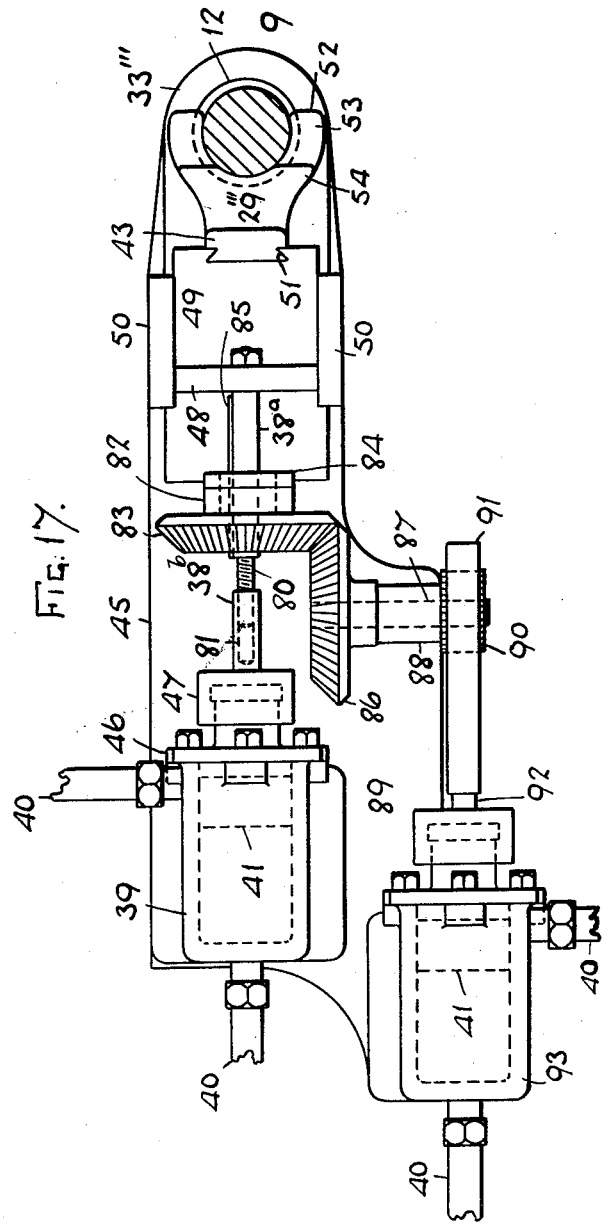
J. T. Wood
BY
Fetherstonhaugh & Tansley Patented Apr. 24, 1934

1,955,869

UNITED STATES PATENT OFFICE 1,955,869

APPARATUS FOR FEEDING PREDETERMINED DIFFERENT WEIGHTS OF MOLTEN GLASS

John Thomas Wood, Sale, England

Application December 10, 1932, Serial No. 646,648
In Great Britain December 11, 1931

13 Claims. (Cl. 49—55)

This invention relates to improvements in automatic means or apparatus for feeding alternately or successively predetermined different weights of molten glass from a glass feeder.

The object of this invention is to provide a distance piece of one or more thicknesses,—operated as hereinafter more fully described,—which is carried by, and combined with, an adjustable stop mounted on the plunger piston rod, whereby the said parts are capable of being readily timed to work in unison for regulating the stroke of the plunger which controls the flow of the glass from the feeder.

The various means for operating the above named distance piece for placing it in and out of position are illustrated in the annexed drawings, in which—

Figure 7:
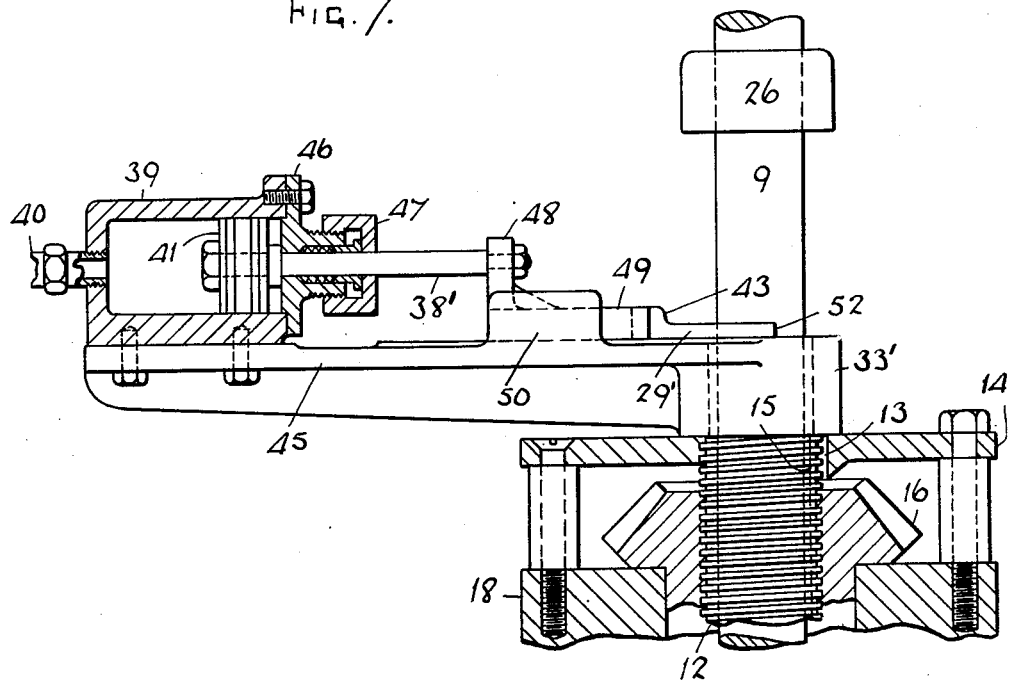
Figure 8:
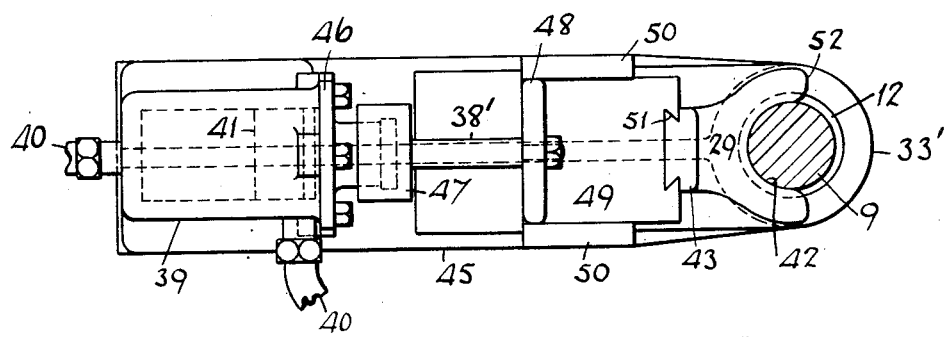

Fig. 1 is a part front elevation of a feeder with this invention applied thereto;

Fig. 2 a part sectional side elevation of Fig. 1;

Fig. 3 an elevation of a double acting valve employed for operating the cylinder which operated the distance piece;

Fig. 4 a sectional side elevation of Fig. 3;

Fig. 5 a side elevation of a suitable type of distance piece made of one thickness;

Fig. 6 a plan of Fig. 5;

Fig. 7 a part side sectional elevation showing a distance piece of one thickness operated directly by a compressed air cylinder;

Fig. 8 a plan looking on the top of Fig. 7;

Fig. 9 a plan view showing a distance piece of more than one thickness operated directly by a compressed air cylinder, the stroke of which is capable of being limited by a cam operated stop;

Fig. 10 a side elevation of a suitable type of spur pinion for operating the cam shown at Fig. 9;

Fig. 11 a side elevation showing the cam operating rack and the method of fixing to the piston rod;

Fig. 12 a side elevation of a distance piece made in more than one thickness;

Fig. 13 a plan of Fig. 12;

Fig. 14 a plan showing a modified arrangement of distance piece which is formed in two parts capable of being moved into position by a crosshead fixed to a compressed air cylinder piston rod;

Fig. 15 a plan showing an arrangement similar to that shown in Fig. 9, the distance piece in this being of two thicknesses and the stop operated by the compressed air cylinder;

Fig. 16 an end elevation of Fig. 15;

Fig. 17 a plan showing a distance piece formed in two thicknesses, the piston rod of the operating cylinder being divided into two parts capable of movement in relation to each other by means of bevel gearing, rack and pinion, and operating cylinder;

Fig. 18 an end elevation of Fig. 17.

The several views are drawn to varying scales, and like parts in all the views are marked with similar reference numerals.

1 is a feeder of ordinary construction, 2, 2, the uprights of the framework which are fixed at the lower ends to the feeder, and their upper ends are braced together by the horizontal girder 3. On the top of the girder 3 are fixed, by any suitable means, a pair of uprights 4, 4. 5 is the operating cylinder which is fixed to the top of the uprights 4 and provided with covers 6, 6, and glands 7, 7, at each of its ends. 8 is a piston arranged to work in the cylinder 5 and provided with a piston rod 9 of any suitable length, to the lower end of which is secured the plunger 10. In the upper gland 7 is mounted a rod 11 which is employed for regulating the upward stroke of the piston 8.

All the above parts are of the usual and known construction and will be readily understood without further description.

On the piston rod 9 is slidably mounted an adjusting stop 12 prevented from rotation by a key 13 (Fig. 7) carried by a bracket 14 and keyway 15 formed in the stop 12. On the adjustable stop 12, which is in the form of a screw threaded sleeve (Fig. 7) is shown a mitre wheel 16 which is retained by a collar 17 in a bracket 18 fixed to the uprights 4. The mitre wheel 16 is geared to a second mitre wheel 19 mounted upon a horizontal shaft 20 provided at its opposite end with a third mitre wheel 21 which gears with a fourth mitre wheel 22 at the top of a vertical shaft 23 which is operated by a hand wheel 24 fixed thereon at a suitable distance from its lower end. The shafts 20 and 23 are carried in suitable bearings 25 formed on, or fixed to, the framework of the feeder. The adjustable stop 12 is arranged to intermittently engage with a fixed stop 26 secured to the piston rod 9.

In this arrangement the position of the adjustable stop 12 is regulated by turning the hand wheel 24 which causes the vertical shaft 23 to be rotated, and by means of the mitre gearing 16, 19, 21 and 22, raises or lowers the adjustable stop 12 to the required position for lengthening or shortening the plunger's stroke.

If desired suitable automatic means, such as, say, a pinion 27 and rack 28, operated in any suitable manner by a compressed air cylinder, is connected to the operating shaft 23 of the adjustable stop 12 for regulating the latter.

With the just named parts is combined a distance piece 29 which may be made of any desired thickness and securely held between the bifurcations 30 of the horizontal part of a lever 31, the lower end of which is pivoted to the lower end 32 of bracket 33 which is attached to the top of the adjustable stop 12, or it may be fixed in any other suitable position so that the pivot 34 carrying the distance piece 29 and lever 31 is moved in an upward or downward direction simultaneously with the adjustable stop 12. The lower portion of the lever 31 that carries the distance piece 29 is arranged at an angle to its horizontal upper portion, as shown at Fig. 2. The hereinbefore named bracket 33 to which the lever 31 is pivoted is provided with a horizontal portion 35 which extends a suitable distance from the adjustable stop 12, the outer end 32 of said portion 35 being turned in a downward direction. The lower inclined end of the lever 31 is carried in a horizontal or inclined direction for a suitable distance beyond its pivot 34 when it is turned in an upward vertical direction so that its upper end 36 passes through a slot 37 in one end of a horizontal piston rod 38, or through a suitable bracket secured to the rod 38. The cylinder 39 of the piston rod 38 is placed in any suitable position, say, for example, carried by a bracket fixed directly to the operating cylinder 5 of the feeder plunger 10. Compressed air is supplied alternately to each end of the cylinder 39 through suitable inlet openings to which air lines or tubes 40 are secured for connecting the cylinder 39 with the valves on the feeder timer, or valves operated by any moving part of the feeder 1. When compressed air is admitted at one of the ends of the cylinder 39 the piston 41 therein is moved in a rearward direction, and simultaneously the piston rod 38 moves the upstanding portion 36 of the lever 31, whereby its bifurcated end 30 will be turned on its pivot 34, and the distance piece 29 thereby automatically placed on the top of the adjustable stop 12. When this is done the fixed stop 26 on the plunger piston rod 9 will rest upon the upper surface of the distance piece 29 when it completes its downward stroke, thereby shortening the stroke of the plunger 10.

The just described arrangement is shown at Figs. 1 and 2, and a suitable type of distance piece 29 is shown at Figs. 5 and 6, in which the distance piece is provided with a semicircular recess 42 for the passage of the plunger piston rod 9 and a dovetailed end 43 which fits into the bifurcations 30 of lever 31, a hole 44 being provided in the end 43 for the reception of any suitable type of securing pin.

If it is desired to dispense with the pivoted lever 31 and mount the cylinder 39 on the same bracket as the distance piece, then,—as shown at Figs. 7 and 8,—the bracket 33' is provided with a horizontal extension 45, on the outer end of which is fixed the air cylinder 39 closed at one end and its opposite end is provided with a cover 46 having the usual stuffing box and gland 47 through which the piston rod 38' passes. Upon the inner end of the piston rod 38' is mounted the piston 41. The cylinder 39 is also provided with the usual inlet and outlet openings for admitting the compressed air or other fluid which passes through the air lines or tubes 40 alternately on both sides of the piston 41 for operative purposes, and for the exhaust. The outer end of the piston rod 38' is connected to an upstanding portion 48 of a horizontal slide 49,—capable of intermittent reciprocation,—arranged to work between guides 50 formed on, or fixed to, the upper surface of the extension 45 of the bracket 33'. The outer end,—that is, the end nearest to the plunger piston rod 9,—of the slide 49 is arranged to project a suitable distance beyond its guides 50 and is provided with a dovetail or other vertical slot or bifurcation 51 for the reception of the suitably shaped outer end 43 of the distance piece 29', the inner end 52 being provided with the semicircular or other shaped recess 42 for the passage of the plunger piston rod 9. The said inner end 52 is arranged to be inserted between the upper surface of the adjustable stop 12 and the before named fixed stop 26. By attaching the distance piece 29' to the horizontal slide 49 as just described, provision is made for the insertion and removal of distance pieces of varying thicknesses so as to obtain the required predetermined different weights of glass. In some cases instead of employing a number of distance pieces of varying thicknesses, one distance piece is provided with an inclined or stepped upper surface. A suitable type of stop is shown at Figs. 12 and 13, in which three steps 53, 54, 55, are provided. When the latter type of distance piece is employed, then a stop or stops 56 is or are provided for regulating its inward movement (Figs. 9, 15 and 16). The said stop or stops 56 is or are arranged to be operated by hand or by automatic means. When operated automatically the means may consist of a tapered, stepped or other shaped distance piece 56 arranged on the end of a rod or shaft 57 carried in bearings 58 formed or fixed on, say, an extension 59 of the bracket 33'' which is secured to the adjustable stop 12. The rod or shaft 57 is operated by, say, a cam 60,—connected to any working part of the feeder,—a compressed air cylinder or by other suitable means.

At Fig. 9 a distance piece 29'' provided with three steps 53, 54, 55, is shown, in which case a distance piece or stop 56 provided with two steps 61, 62 is required for limiting the inward stroke of the piston rod 38'' and parts connected therewith. The stop 56 is arranged to work in a recess 63 formed in one of the guides 50 and be operated by a cam 60 provided with two projections 64, 65, which intermittently work against a roller 66 carried by the bifurcated end 67 of the rod or shaft 57. A spring 68 is mounted on the rod or shaft 57 between the bifurcated end 67 and the bearing 58 for retaining the roller 66 in engagement with the cam 60 and its projections 64, 65. The cam 60 is mounted on a shaft 69 carried by bearings 70, 70, formed on the outer bifurcated end of the extension 59. One end of the shaft 69 is arranged to project a suitable distance beyond one of the bearings 70 for the reception of a spur pinion 71 which is arranged to mesh with a vertical rack 72 carried by an arm 73 secured at its inner end by, say, set screws 74, 74, to the fixed stop 26, or any suitable part of the plunger piston rod 9.

The construction of the rack 72 and its arm 73 is shown at Fig. 11, in which the rack 72 is shown to be at a right angle to, and pendant from, the arm 73.

To rotate the cam 60 in one direction, the pinion 71 is formed in two parts, the centre portion 75 being provided with a recess 76 in which a spring controlled pawl 77 is arranged. The said pawl 77 engages with the ratchet teeth 78 formed in the inner periphery of the spur pinion 71. By this arrangement, on, say, the downward stroke of the plunger piston rod 9, the pawl 77 will ride over the ratchet teeth 78; but on the upstroke, the pawl 77 will engage with said teeth for rotating the shaft 69 and cam 60.

If desired instead of connecting the rack 72 to the plunger piston rod 9 a separate air cylinder may be provided for operating the same.

At Fig. 15 the distance piece 29″ is shown provided with two steps 53, 54, and a stop 56 with only one step 61. In this arrangement the rod or shaft 57 forms the piston rod of a compressed air cylinder 79 which is mounted on the outer end of the extension 59 and is similar in construction, and operated in a like manner, to the air cylinder 39 employed for operating the distance piece 29. When the stop 56 and its operating parts are employed, then they are arranged at an angle to the operating cylinder 39 and parts connected therewith,—as shown at Figs. 9 and 15,—so that the stroke of the latter is definitely limited, when desired, by the movement of the first named parts.

At Figs. 17 and 18 an arrangement is shown in which the stop 56 is dispensed with and in place thereof the piston rod is divided into two parts, the portion 38ª being connected at one end to the upright part 48 of the slide 49 and at its opposite end provided with a reduced screw threaded portion 80 which enters a screw threaded hole 81 formed in the portion of the piston rod 38ᵇ. The portion 38ª is mounted in a bearing 82 formed on the extension 45 of bracket 33‴, and in the said bearing is mounted a bevel wheel 83 retained in position by a collar 84. A key 85 is provided in the portion 38ª and a keyway in the bevel wheel 83 so that when the bevel wheel 83 is rotated, the reduced portion 80 of the portion 38ª will be moved into, or out of, the hole 81 for lengthening or shortening the piston rod, and also the complete stroke of it and the parts connected therewith. In order to rotate the bevel wheel 83 a second bevel wheel 86 is arranged at a right angle thereto which is mounted on a shaft 87 carried by bearing 88 formed on an extension 89 of the portion 45 of bracket 33‴. On the extended end of the shaft 87 is mounted and fixed a spur pinion 90 which meshes with a horizontal rack 91 formed or fixed on the end of the piston rod 92 of an operating air cylinder 93 also mounted on the extension 89 and parallel with the air cylinder 39. The said air cylinder 93 is similar in construction and operation to the cylinder 39.

In some cases,—as shown at Fig. 14,—it may be found more convenient to provide the adjustable stop or the horizontal bracket 33ᴵⱽ with a projection or lug 94 in which is fixed a vertical pin 95 on which is pivoted a pair of curved jaws or levers 96, 96, the free ends 97 of which are inwardly inclined, that is to say, the opening or space between the ends 97 of the jaw is smaller at the end nearest to the plunger piston rod 9 than at its outer end. In each inclined end 97, and parallel therewith, is formed a slot 98 in which a roller 99,—carried by a cross-head 100,— is arranged to work. The said cross-head 100 is fixed to the end of the piston rod 38ᴵⱽ of the operating cylinder 39 whereby, when the said rod 38ᴵⱽ is moved away from the plunger piston rod 9, the ends 97 of the two curved jaws or levers 96 will be closed together. The movement of the jaws or levers 96 is for enabling a pair of tapered, stepped or other shaped distance pieces 29ᴵⱽ,—detachably secured thereto,—to be inserted between the adjustable stop 12 and the fixed stop 26 on the plunger piston rod 9.

The provision of a tapered or stepped distance piece controlled by a stop or stops 56 of one or more thicknesses capable of being moved into the path of the operating means of said distance piece, and its arrangement in conjunction with the adjustable stop 12 on the plunger piston rod 9, allows a variety of predetermined weights of molten glass to be discharged from the feeder 1 in sequence. That is to say, for the arrangement shown in Fig. 9, in which a distance piece 29″ of three thicknesses is employed, the adjustable stop 12 is first moved to its desired position and the plunger 10 then allowed to make a complete downward stroke until the fixed and adjustable stops 26 and 12 mounted on the plunger rod, are in abutment; for the plunger's second stroke, the first or thinnest portion 53 of the distance piece 29″ is moved into position; for the third and fourth strokes, the second and third portions 54, 55 of the distance piece 29″ are respectively moved into position between the fixed and adjustable stops 26 and 12, whereby a sequence of strokes of the plunger 10, gradually diminishing in length, is automatically obtained. With the two arrangements shown in Figs. 15 to 18, three different predetermined weights of molten glass are delivered by controlling the plunger 10 so as to obtain a complete stroke of the plunger 10 and two shorter strokes, by the insertion of the portions 53, 54, of the distance piece which is controlled by the stop 56 or the divided piston rod. The same results may be obtained with an interchangeable distance piece of one thickness when the adjustable stop 12 on the plunger piston rod 9 is automatically operated. In the latter case the said stop 12 is timed to operate in conjunction with the distance piece so that, say, for example, the plunger 10 is first allowed to make a complete stroke, secondly, the adjustable stop 12 is moved by, say, the pinion 27 and rack 28, to alter the stroke, and thirdly, the distance piece is inserted, whereby three different weights of glass are obtained. The arrangement shown in Fig. 14 may be provided with distance pieces of one or more thicknesses as required, and be controlled by stops or the like in a similar manner to that already described for obtaining the requisite number of different weights of molten glass.

By the foregoing means a number of predetermined different weights of glass may be obtained and the order in which the said weights are delivered may be varied as and when required.

If it is desired to feed two or more predetermined different weights of molten glass by the just named arrangement, then one or more double acting valves 101,—shown at Figs. 3 and 4,—would be employed. The casing 102 and plunger,—which forms the valve 101,—are provided with a number of ports and passages to form a double acting valve. The first passage 103 in the valve plunger 101 is L-shaped and it communicates at one end with a port 104 formed in the wall of the casing and at its outer end with the upper surface of the plunger 101 for forming an exhaust passage. A second horizontal passage 105 is formed at or about the centre of the plunger's length and is arranged to communicate with the compressed air inlet pipe 106 and with a port 107. A vertical recess 108 is formed in the periphery of the plunger 101 in such a manner that it passes in a downward direction from the central horizontal passage 105 at the inlet end thereof. A third and L-shaped exhaust passage 109 is formed in the plunger 101 below the central horizontal passage 105 so that when the plunger 101 is in its lowest and normal position its outer ends are closed, compressed air only passing from the inlet pipe 106 through the plunger 101 into and through one of the before named ports. The valves 101 in this case would be operated by cams 110 secured to a shaft 111 capable of rotation by bevel or other gearing, sprocket wheels and a chain or chains, spur gearing or other similar mechanical means,—not shown in the drawings,—and when the automatic feeding of two predetermined different weights of molten glass is required then the driven bevel or sprocket wheel will be provided with twice as many teeth as the driving bevel or sprocket wheel.

Compressed air is supplied alternately to each end of the operating cylinders 39, 79, and 93 of the distance piece 29 and stop 56 or rack 91 through air lines or tubes 40 which connect the cylinders 39, 79, and 93, with the just named valve or valves 101. The said valve or valves 101 is or are mounted on the feeder timer or operated by any moving part of the feeder.

The herein described distance piece in all cases is attached to its lever 31, slide 49 or jaws 96, in such a manner that it may easily be replaced when different weights of molten glass are required. Also, that the inclined portion of the lever 31 may be separate from the portion 36 of the lever, the two portions 31, 36, then being mounted on a common pivot and fixed thereto. Also, although stepped distance pieces and stops are shown in the drawings, they may be replaced by distance pieces and stops provided with inclined upper surfaces for obtaining the same results.

It will readily be understood that the distance piece 29 is mounted on the bracket 33 carried by the adjustable stop 12 so that when the latter is moved the distance piece 29 will be moved therewith for ensuring synchronization in the timing of the two parts, thus any separate vertical adjustment of the distance piece 29 and parts connected therewith is dispensed with.

I am aware that prior to the date of this application the upward and downward stroke of the plunger piston rod has been controlled by a stop or abutment formed on the end of the piston rod of a compressed air cylinder which is mounted at a right angle to, and arranged to limit the movement of, a tail rod projecting upwardly from the piston of the plunger operating cylinder. The first named cylinder is mounted,—so as to be capable of adjustment by hand,—in a vertical bracket rigidly fixed to the plunger operating cylinder. Provision has also been made for a number of the said stops and their cylinders to be moved in and out of the path of the tail rod of the plunger cylinder, and that valves for regulating the supply of compressed air to the said cylinders have also been employed, but I make no claim to the use of such parts except when constructed and arranged as herein set forth.

What I claim is:—

1. Apparatus for feeding predetermined variable weights of molten glass including a plunger, a piston rod for operating said plunger, a stop member adjustably positioned about said piston rod and cooperating with a fixed stop member on said piston rod to limit the stroke of said plunger, and a distance piece carried by said adjustable stop member and adapted to be inserted between the fixed and adjustable stop members, whereby the stroke of said plunger is altered by a predetermined amount.

2. Apparatus for feeding predetermined variable weights of molten glass including a plunger, a piston rod for operating said plunger, a stop member comprising an externally threaded sleeve, keyed to prevent rotation, adjustably positioned about said piston rod and cooperating with a fixed stop member on said piston rod to limit the stroke of said plunger, gear mechanism engaging said threaded sleeve for varying the position of said sleeve, and a distance piece carried by said adjustable stop member and adapted to be inserted between the fixed and adjustable stop members, whereby the stroke of said plunger is altered by a predetermined amount.

3. Apparatus for feeding predetermined variable weights of molten glass including a plunger, a piston rod for operating said plunger, a stop member comprising an externally threaded sleeve, keyed to prevent rotation, adjustably positioned about said piston rod and cooperating with a fixed stop member on said piston rod to limit the stroke of said plunger, an internally threaded gear member mounted on said sleeve, means including gear and shaft members for transmitting motion to said threaded gear from a suitably positioned hand wheel whereby the position of said sleeve may be varied, and a distance piece carried by said adjustable stop member and adapted to be inserted between the fixed and adjustable stop members, whereby the stroke of said plunger is altered by a predetermined amount.

4. Apparatus for feeding predetermined variable weights of molten glass including a plunger, a piston rod for operating said plunger, a stop member adjustably positioned about said piston rod and cooperating with a fixed stop member on said piston rod to limit the stroke of said plunger, and a detachable and interchangeable distance piece carried by said adjustable stop member and adapted to be inserted between the fixed and adjustable stop members, whereby the stroke of said plunger is altered by a predetermined amount.

5. Apparatus for feeding predetermined variable weights of molten glass including a plunger, a piston rod for operating said plunger, a stop member adjustably positioned about said piston rod and cooperating with a fixed stop member on said piston rod to limit the stroke of said plunger, a distance piece carried by said adjustable stop member and means for inserting said distance piece between said stop members at predeterminable intervals whereby the stroke of said plunger is altered by a predetermined amount.

6. Apparatus for feeding predetermined variable weights of molten glass including a plunger, a piston rod for operating said plunger, a stop member adjustably positioned about said piston rod and cooperating with a fixed stop member on said piston rod to limit the stroke of said plunger, a distance piece carried by said adjustable stop member and means including a compressed air cylinder, a piston positioned therein and means connecting said piston with said distance piece for inserting said distance piece between said stop members at predeterminable intervals whereby the stroke of said plunger is altered by a predetermined amount.

7. Apparatus for feeding predetermined variable weights of molten glass including a plunger, a piston rod for operating said plunger, a stop member adjustably positioned about said piston rod and cooperating with a fixed stop member on said piston rod to limit the stroke of said plunger, a distance piece carried by said adjustable stop member and means including a compressed air cylinder, a piston positioned therein and lever mechanism pivoted to said adjustable stop member connecting said piston with said distance piece for inserting said distance piece between said stop members at predeterminable intervals whereby the stroke of said plunger is altered by a predetermined amount.

8. Apparatus for feeding predetermined variable weights of molten glass including a plunger, a piston rod for operating said plunger, a stop member adjustably positioned about said piston rod and cooperating with a fixed stop member on said piston rod to limit the stroke of said plunger, a distance piece carried by said adjustable stop member and means including a compressed air cylinder mounted on said adjustable stop member, a piston positioned therein and means connecting said piston with said distance piece for inserting said distance piece between said stop members at predeterminable intervals whereby the stroke of said plunger is altered by a predetermined amount.

9. Apparatus for feeding predetermined variable weights of molten glass including a plunger, a piston rod for operating said plunger, a stop member adjustably positioned about said piston rod and cooperating with a fixed stop member on said piston rod to limit the stroke of said plunger, a distance piece of progressively increasing thickness carried by said adjustable stop member and means for inserting said distance piece between said stop members to a predeterminable extent and at predeterminable intervals whereby the stroke of said plunger is altered by a predetermined amount.

10. Apparatus for feeding predetermined variable weights of molten glass including a plunger, a piston rod for operating said plunger, a stop member adjustably positioned about said piston rod and cooperating with a fixed stop member on said piston rod to limit the stroke of said plunger, a distance piece having a stepped upper surface carried by said adjustable stop member and means for inserting said distance piece between said stop members to a predeterminable extent and at predeterminable intervals whereby the stroke of said plunger is altered by a predetermined amount.

11. Apparatus for feeding predetermined variable weights of molten glass including a plunger, a piston rod for operating said plunger, a stop member adjustably positioned about said piston rod and cooperating with a fixed stop member on said piston rod to limit the stroke of said plunger, a distance piece of progressively increasing thickness carried by said adjustable stop member and means for inserting said distance piece between said stop members to a predeterminable extent and at predeterminable intervals, including a compressed air cylinder having a piston and piston rod connected to said distance pieces and means for adjusting the stroke of said piston whereby the stroke of said plunger is altered by a predetermined amount.

12. Apparatus for feeding predetermined variable weights of molten glass including a plunger, a piston rod for operating said plunger, a stop member adjustably positioned about said piston rod and cooperating with a fixed stop member on said piston rod to limit the stroke of said plunger, a distance piece of progressively increasing thickness carried by said adjustable stop member and means for inserting said distance piece between said stop members to a predeterminable extent and at predeterminable intervals, including a compressed air cylinder having a piston and piston rod connected to said distance pieces and means for adjusting the effective length of said piston rod whereby the stroke of said plunger is altered by a predetermined amount.

13. Apparatus for feeding predetermined variable weights of molten glass including a plunger, a piston rod for operating said plunger, a stop member adjustable positioned about said piston rod and cooperating with a fixed stop member on said piston rod to limit the stroke of said plunger, a pair of jaw members inclosing said piston rod and pivoted to said adjustable stop member, paired distance pieces carried by said jaw members and means for opening and closing said jaw members about said piston rod whereby said distance members may be inserted between the fixed and adjustable stop members to alter the stroke of said plunger by a predetermined amount.

JOHN THOMAS WOOD.